Feb. 2, 1932. A. B. SEPPMANN 1,843,341
BRAKE TESTING APPARATUS
Filed July 11, 1928
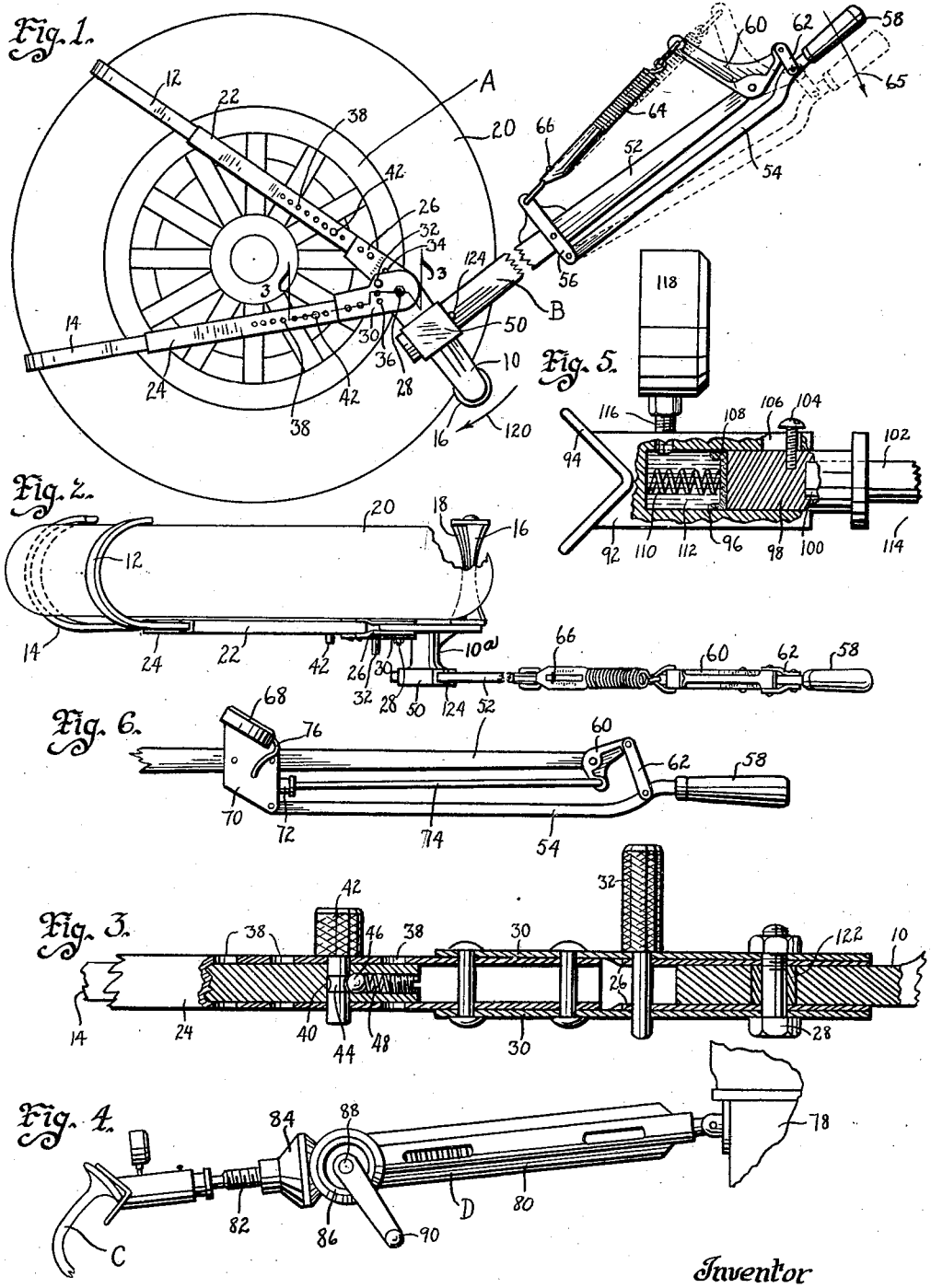

Patented Feb. 2, 1932

1,843,341

UNITED STATES PATENT OFFICE

ALFRED B. SEPPMANN, OF LAKE CRYSTAL, MINNESOTA

BRAKE TESTING APPARATUS

Application filed July 11, 1928. Serial No. 291,823.

The object of my invention is to provide a brake testing apparatus of simple, durable and comparatively inexpensive construction.

A further object of my invention is to provide a brake testing apparatus of improved construction over my application, Serial Number 180,821, filed April 4, 1927, and which is more accurate in determining the true condition of brakes on an automobile.

Still a further object is to provide a brake pedal depressing means including a gauge for determining the amount of pressure exerted on the brake pedal, which is necessary to the accuracy of the apparatus.

Still a further object is to provide means for rotating a wheel of the automobile after it has been jacked up and the brake pedal has been depressed and including a measuring mechanism for indicating the amount of energy required for rotating the wheel against the action of the brake thereon.

With these and other objects in view my invention consists in the construction, arrangement and combination of the various parts of my device, whereby the objects contemplated are attained, as hereinafter more fully set forth, pointed out in my claims and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a side elevation of an automobile wheel showing the mechanism for rotating the wheel applied thereto and indicating in dotted lines, the position which the parts assume upon operation of the rotating device.

Figure 2 is a plan view of a portion of the apparatus shown in Figure 1.

Figure 3 is an enlarged sectional detail view on the line 3—3 of Figure 1.

Figure 4 is a side elevation of the brake pedal depressing means.

Figure 5 is an enlarged view of a portion of the pedal depressing means showing part of it in section to illustrate the construction thereof; and Figure 6 is a modified form of operating handle for the wheel rotating means.

In the accompanying drawings, I have used the reference character A to indicate generally, the wheel of an automobile. Applied to the wheel A is a wheel rotating mechanism B consisting of three tire engaging arms 10, 12 and 14. The engaging arm 10 is substantially L-shaped, as clearly shown in Figure 2 and one leg of the L extends along the side of the tire and the other leg referred to at 16 extends over the tread of the tire and engages the same. The arm 16 is round in cross section, being smaller at its center than at its ends. The portion 18 of the arm 16 is corrugated for gripping the tire 20 of the wheel A.

The arms 12 and 14 are hook-shaped at their outer ends, as shown in Figure 2 and extend slidably into tubes 22 and 24. The tube 22 is secured to a pair of plates 26 pivoted on a bolt 28 extending through the L-shaped arm 10. The tube 24 is secured to a pair of plates 30 pivoted to the same bolt 28.

Due to the pivotal connections of the plates 26 and 30 to the member 10, the arms 12 and 14 may be adjusted toward or away from each other, depending on the size of the tire 20. Such adjustment is maintained by a removable pin 32 extending through a plurality of openings 34 in the plates 26 and through openings 36 in the plates 30, which are adapted to register with each other.

By providing a plurality of openings, different adjustments of the angle between the hook arms 12 and 14 may be had.

For adapting the device B for larger size tires, a plurality of openings 38 are provided in the tubes 22 and 24 and an opening 40 is provided near the inner end of each hook arm 12 and 14. The openings 40 may be caused to register with any of the openings 38 desired, after which a removable pin 42 is inserted through both the tube and the hook arm for maintaining such adjustment. The pin 42 is provided with an annular groove 44 into which a ball 46 is pressed by a spring 48 so that the pin 42 will not accidentally drop out.

A socket 50 is formed on the L-shaped member 10 and is adapted to receive an operating lever 52. A second lever 54 is pivoted to a bracket 56 on the operating lever 52 and is provided at its outer end with a handle 58. A bell crank 60 is pivoted to the outer end of the lever 52 and is operatively connected to the secondary lever 54 by a link 62. A spring scale 64 is hooked to the bell crank 60 and to the bracket 56 whereby movement of the secondary lever 54 relative to the operating lever 52 and in the direction of the arrow 65, as shown in dotted lines in Figure 1 will operate the scale. The scale 64 may then be read, as it has an indicating needle 66 adapted to travel along a calibrated scale.

Instead of using the spring scale 64, the movement of the bell crank lever 60 may be measured by an oil gauge 68, illustrated in Figure 6. The gauge 68 is mounted on a bracket 70 in which a cylinder is formed. A piston 72 and connecting rod 74 serve to exert a pressure on oil in the cylinder within the bracket 70 and such oil will be conducted through a tube 76 to the oil gauge 68. The internal construction of the bracket 70 is similar to the construction shown in Figure 5, which will hereinafter be more fully described.

For depressing the brake pedal C of the automobile, I provide an extensible member D adapted to be interposed between the brake pedal and the front seat 78 of the automobile. The device D consists of a tubular member 80 having a screw threaded rod 82 slidably, but non-rotatably mounted therein. A bevel gear 84 is screw threadedly mounted on the rod 82 and may be rotated by a second bevel gear 86 mounted on a stud 88 extending from the tubular portion 80. A hand crank 90 is secured to the bevel gear 86 for rotating the same.

A cylinder member 92 is provided with a V-shaped seat 94 adapted to fit over the brake pedal C. The cylinder member 92 is provided with a bore 96 into which a piston or plunger 98 slidably extends. The piston 98 is provided with a socket 100 adapted to receive the reduced end 102 of the threaded rod 82. A screw 104 and a slot 106 serve to prevent removal of the piston 98 from the cylinder member 92 and yet allows sliding movement of one relative to the other.

A flexible cup member 108 is mounted in the bore 96 and is held in position against the head of the piston 98 by a light spring 110. The bore 96 is filled with oil 112, which, when the piston 98 is moved in the direction of the arrow 114, is forced through a fitting 116 into an oil gauge 118. The piston 98 is made one inch in area so that pounds per square inch read on the gauge 118 will actually represent the pounds of pressure on the piston 98 relative to the cylinder 92.

Practical operation

Automobile brakes, especially those of the four-wheel type, must have the same braking power on the wheels on each side of the automobile in order to prevent skidding, caused by one brake having more braking power than another. Therefore, the brakes of the front wheels of the automobile should test the same as each other and the rear brakes should test the same as each other. Incidentally, the best operation is had by having more braking power on the rear wheels than on the front ones, but the braking power on opposite sides of the automobile must be the same for proper operation.

In the use of my brake testing device, the extensible member D is placed in position as shown in Figure 4, and the bevel gear 84 rotated by manipulating the crank 90 until the gauge 118 reads around fifty pounds, as this is the average maximum at which the brake pedal will be depressed by the foot of the driver of the automobile.

It is desirable to test the brakes under a full load, as such a full load would occur in an emergency and since testing under partial load will show a variation in brakes which are tested under full load, it is very necessary that they should be tested under full load, since the greatest braking effect of the brakes should occur in an emergency.

After the device D has been operated, the wheel rotating device B is adjusted to one of the wheels of the automobile. This wheel is then jacked up and the handle 58 grasped by the operator and pressed downwardly. Such downward movement of the handle 58 swings the member 10 in the direction of the arrow 120 with the bolt 28 acting as a pivot. It will be noted that in Figure 3 a sleeve 122 is provided on the bolt 28 to prevent binding of the member 10 between the plates 26 and 30. A stop pin 124 is provided on the operating lever 52 so that its length will always be the same when inserted in the socket 50.

After a certain amount of pressure, the wheel will begin to rotate and at the starting of such rotation the scale 64 will read rather high, but right after the wheel has begun to rotate, the reading will drop and stay at a certain calibration on the scale as the wheel is rotated further. This reading is then noted and the wheel on the opposite side of the car tested. If the two readings do not test equal or do not test what they should on a full load on the brake pedal the brakes are adjusted and retested until proper reading results. The wheels at the other end of the car are then tested in the same way.

In Figure 6, I have illustrated a modified form of construction in which reading from the oil gauge 68 will indicate the pressure exerted on the handle 58 for rotating the wheel A. In other respects this operating device is similar to the one shown in Figure 1.

It will be noted that the member 10 has the laterally projecting portion 10a on which the socket 50 is formed. The member 10a projects laterally far enough to enable the lever 52 to clear the fender of the automobile.

It will also be observed that the socket 50 is open at both ends so that when the device is transferred from one side of the automobile to the other, it can be used conveniently by simply inserting the lever into the other end of the socket. This makes the device adaptable for both right and left hand wheels.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a brake testing apparatus, means for rotating a wheel of an automobile comprising an L-shaped tire engaging member, a pair of tire engaging hook arms pivoted thereto, a lever connected with said L-shaped member and measuring means on said lever to determine the force exerted thereon for turning the wheel.

2. In a brake testing apparatus, means for rotating a wheel of an automobile comprising an L-shaped tire engaging member, a pair of tire engaging hook arms pivoted thereto, a lever connected with said L-shaped member and measuring means on said lever to determine the force exerted thereon for turning the wheel, said measuring means comprising a secondary lever, means pivotally connecting the secondary lever to the first lever, a bell crank pivoted to both levers and means for measuring the movement of the bell crank relative to the first lever.

3. In a brake testing apparatus, means for determining the force required to rotate a wheel of an automobile comprising an L-shaped tire engaging member, a pair of tire engaging hook arms pivoted thereto, a lever detachably connected with said L-shaped member, a bell crank on the outer end of said lever, a secondary lever, means for operatively connecting the secondary lever to said first lever and to said bell crank, a handle on said secondary lever and means for measuring the movement of said bell crank relative to said first lever.

4. In a brake testing apparatus, means for determining the force required to rotate a wheel of an automobile comprising an L-shaped tire engaging member, a pair of tire engaging hook arms pivoted thereto, a lever detachably connected with said L-shaped member, a bell crank on the outer end of said lever, a secondary lever, means for operatively connecting the secondary lever to said first lever and to said bell crank, a handle on said secondary lever and means for measuring the movement of said bell crank relative to said first lever, said means comprising a cylinder, a piston and fluid therein and a gauge adapted to receive and be actuated by such fluid when flowing from said cylinder.

5. In a brake testing apparatus, means for determining the force required to rotate a wheel of an automobile comprising an L-shaped tire engaging member, a pair of tubes pivoted thereto, a tire engaging hook arm slidable in each tube, each tube and each hook arm being provided with a plurality of openings and a pin to coact therewith for maintaining one adjusted with respect to the other, a lever operatively connected with said L-shaped member, a bell crank on the outer end of said lever, a secondary lever, means for operatively connecting said secondary lever to said first lever and to said bell crank, a handle on said secondary lever and means for measuring the movement of said bell crank relative to said first lever.

6. In a brake testing apparatus, means for engaging and rotating a wheel against the action of the brake thereon, including a laterally projecting member having a socket open at both sides and a lever adapted to be inserted in said socket from either side whereby the device may be used for either right or left hand wheels and means associated therewith for indicating the resistance of the brake.

7. In a brake tester, means for engaging the tire of an automobile, a lever for rotating said means and mechanism for measuring the force applied to said lever comprising a hydraulic gauge, a secondary lever, means pivotally connecting the secondary lever to the first mentioned lever and means for actuating said gauge in relative proportion to the movement of the secondary lever relative to the first lever, said means comprising a bell crank connection between portions of the first and secondary levers, a cylinder, a piston therein and an operative connection between said bell crank and said piston.

8. A wheel rotating device comprising a relatively short L-shaped tire engaging lever, relatively long tire engaging hook arms pivoted thereto and an operating lever connected with said L-shaped arm and provided with means to measure the force applied to move the lever.

9. A brake tester comprising a medially laterally offset lever, a plurality of clutch members pivoted to said lever and offset at their extremities in a direction opposite to the offset of said lever, said offset portions being adapted to engage the tread only of a wheel tire, a bell-crank lever pivotally mounted on the outer extremity of said lever, a gauge connected to the offset part of said lever, and a yieldable resilient tension member connected between said gauge and one arm of the bell-crank lever, whereby rocking of the latter in one direction tensions said resilient member and actuates said gauge to cause it to indicate the resistance of the brake to the turning of the wheel, while simultaneously causing said lever to swing to clamp said clutch members upon the tire.

Des Moines, Iowa, June 18, 1928.

ALFRED B. SEPPMANN.